United States Patent
Hu

(10) Patent No.: US 9,938,476 B2
(45) Date of Patent: *Apr. 10, 2018

(54) GAS SEPARATION BY VAPORIZED COMPOUND

(71) Applicant: Liang Hu, Lexingtong, KY (US)

(72) Inventor: Liang Hu, Lexingtong, KY (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/370,467

(22) Filed: Dec. 6, 2016

(65) Prior Publication Data

US 2017/0081603 A1 Mar. 23, 2017

Related U.S. Application Data

(63) Continuation of application No. 13/525,633, filed on Jun. 18, 2012, now Pat. No. 9,545,596.

(60) Provisional application No. 61/498,153, filed on Jun. 17, 2011.

(51) Int. Cl.
  *B01D 53/76* (2006.01)
  *B01D 53/14* (2006.01)
  *C10L 3/10* (2006.01)

(52) U.S. Cl.
  CPC .......... *C10L 3/102* (2013.01); *B01D 53/1425* (2013.01); *B01D 53/1462* (2013.01); *B01D 53/1481* (2013.01); *C10L 3/103* (2013.01); *C10L 3/104* (2013.01); *B01D 2251/304* (2013.01); *B01D 2251/306* (2013.01); *B01D 2252/103* (2013.01); *B01D 2252/204* (2013.01); *B01D 2252/205* (2013.01); *B01D 2252/2023* (2013.01); *B01D 2252/2056* (2013.01); *B01D 2252/20405* (2013.01); *B01D 2252/20421* (2013.01); *B01D 2252/20426* (2013.01); *B01D 2252/20431* (2013.01); *B01D 2252/20442* (2013.01); *B01D 2252/20447* (2013.01); *B01D 2252/20484* (2013.01); *B01D 2252/20489* (2013.01); *B01D 2252/30* (2013.01); *B01D 2252/40* (2013.01); *B01D 2252/504* (2013.01); *C10L 2290/24* (2013.01)

(58) Field of Classification Search
None
See application file for complete search history.

(56) References Cited

U.S. PATENT DOCUMENTS 9,545,596 B2 * 1/2017 Hu .................... B01D 53/1425
2009/0199713 A1 8/2009 Asprion et al.

* cited by examiner

*Primary Examiner* — Daniel Berns
(74) *Attorney, Agent, or Firm* — Novick, Kim & Lee, PLLC; Allen Xue

(57) ABSTRACT

An improved process for deacidizing a gaseous mixture with reduced overall energy costs is described. The process involves contacting the gaseous mixture with at least one of a vaporizing compound, a vaporized compound, a vaporizing solution of compound and a vaporized solution of compound, and forming a liquid or solid reaction product that can be easily separated from the gaseous mixture.

14 Claims, No Drawings

GAS SEPARATION BY VAPORIZED COMPOUND

CROSS-REFERENCE TO RELATED APPLICATIONS

This application is a continuation application of U.S. application Ser. No. 13/525,633 filed on Jun. 18, 2012, which claims the benefit under 35 U.S.C. § 119(e) of U.S. Provisional Application No. 61/498,153, filed Jun. 17, 2011, the contents of which are incorporated herein by reference in their entirety.

FIELD OF INVENTION

The present invention relates to a process for deacidizing a gaseous mixture. More particularly, the present invention relates to a method for the separation of an acid gas from a gaseous mixture using a vaporized absorbent.

BACKGROUND OF THE INVENTION

Deacidization is required before a raw natural gas or any other gaseous mixture that contains significant amounts of acid gas, such as hydrogen sulfide ($H_2S$), carbon dioxide ($CO_2$), NOx, SOx, or similar contaminants, can be utilized. The deacidization process reduces the acid gas impurity in the gaseous mixture to acceptable levels. This is commonly done with an amine gas treatment process. Amine gas treatment processes are common in various types of industrial settings, such as refineries, natural gas processing plants, and petrochemical plants. Amine gas treatment processes include the processes utilizing aqueous solutions of amines to remove acid gas, such as $H_2S$ and $CO_2$, from natural gases.

BRIEF SUMMARY OF THE INVENTION

In one general aspect, embodiments of the present invention relate to a method for deacidizing a gaseous mixture comprising an acid gas. The method comprises:
contacting the gaseous mixture with at least one of a vaporizing compound, a vaporized compound, a vaporizing solution of compound and a vaporized solution of compound;
allowing the at least one of the vaporizing compound, the vaporized compound, the vaporizing solution of compound and the vaporized solution of compound to react with the acid gas to form a reaction product; and
allowing the reaction product to liquefy and/or solidify to thus separate from the gaseous mixture.

In one embodiment, the method of the present invention further comprises regenerating the separated reaction product to obtain the acid gas and the compound. Preferably, the regenerated compound is recycled for use in another cycle of deacidizing the gaseous mixture.

Other aspects, features and advantages of the invention will be apparent from the following disclosure, including the detailed description of the invention and its preferred embodiments and the appended claims.

DETAILED DESCRIPTION OF THE INVENTION

Unless defined otherwise, all technical and scientific terms used herein have the same meaning as commonly understood to one of ordinary skill in the art to which this invention pertains. Otherwise, certain terms used herein have the meanings as set in the specification. All patents, published patent applications and publications cited herein are incorporated by reference as if set forth fully herein. It must be noted that as used herein and in the appended claims, the singular forms "a," "an," and "the" include plural reference unless the context clearly dictates otherwise.

Embodiments of the present invention relate to a method for deacidizing a gaseous mixture comprising an acid gas. The method comprises:
contacting the gaseous mixture with at least one of a vaporizing compound, a vaporized compound, a vaporizing solution of compound and a vaporized solution of compound;
allowing the at least one of the vaporizing compound, the vaporized compound, the vaporizing solution of compound and the vaporized solution of compound to react with the acid gas to form a reaction product; and
allowing the reaction product to liquefy and/or solidify to thus separate from the gaseous mixture.

The acid gas that can be removed from the gas mixture using a method according to an embodiment of the present invention includes, but is not limited to, one or more selected from the group consisting of carbon dioxide ($CO_2$), sulfur dioxide ($SO_2$), sulfur trioxide ($SO_3$), hydrogen sulfide ($H_2S$), carbon oxysulfide (COS), carbon disulfide ($CS_2$), mercaptans (RSH), nitric oxide (NO), nitric dioxide ($NO_2$), fluorides, HCl, HF and a combination thereof.

In one embodiment, the deacidization process according to embodiments of the present invention is used to remove an impurity acid gas from a gaseous mixture, in which case the impurity acid gas can be disposed of. In another embodiment, the deacidization process according to embodiments of the present invention is used to collect an acid gas of interest from a gaseous mixture.

Compounds suitable for the present invention include, but are not limited to, any compound suitable for the absorption of an acid gas according to the process of embodiments of the present invention. In a preferred embodiment, the compound is an amine or a mixture of amines, such as one or more selected from the group consisting of amine; alkanolamines (e.g., monoethanolamine, diethanolamine), triethanolamine, ethanolamines, isopropanolamines, ethyleneamines, alkyl alkanolamines, methyldiethanolamine, piperidine, piperazine, dibutylamine, diisopropylamine, and a combination thereof The amine can be a pure amine. The amine can also be dissolved in a solvent comprising one or more compounds selected from the group consisting of alcohols, glycols, alkanes, unsaturated hydrocarbon, ethers, esters, aldehydes, ketones, glycol ethers, alkylene carbonates, dialkyl carbonates, sulfolane, ionic liquids, polymers and water.

In a preferred embodiment, the solvent is water.

In another embodiment of the present invention, the compound and/or solution of compound is an aqueous or organic solution comprising one or more salts, such as those selected from the group consisting of alkaline compounds, alkaline salts, ammonium compounds, ammonium salts, alkanolamine compounds, alkanolamine salts, alkaline-earth compound, alkaline-earth compound salts, amino acids, amino acid salts and derivatives thereof.

In one embodiment of the present invention, the compound and/or solution of compound is vaporized before its contact with the gaseous mixture.

In another embodiment of the present invention, the compound and/or solution of compound is vaporized upon or after its contact with the gaseous mixture.

The compound and/or solution of compound can be vaporized by heating, lowering the pressure, spraying or any other methods for vaporization in view of the present disclosure.

In one embodiment of the present invention, the reaction product is liquefied or solidified by physical or chemical interactions between the acid gas and the vaporized absorbent, by cooling, by increasing the pressure or by any other methods for condensation or solidification.

In one embodiment of the present invention, the reaction product is liquefied or solidified under a condition in which the compound and/or solution of compound remains in the vapor state.

In another embodiment of the present invention, the reaction product is liquefied or solidified under a condition in which at least some of the compound and/or solution of compound is also liquefied or solidified.

In one embodiment of the present invention, contacting the gaseous mixture with the compound and/or a solution of compound in vapor state forms a reaction product in vapor state, which is subsequently transformed into a liquid or solid state.

In another embodiment of the present invention, contacting the gaseous mixture with the compound and/or solution of compound in vapor state directly forms a reaction product in liquid or solid state.

In an embodiment, the method of the present invention further comprises regenerating the reaction product to obtain an acid gas and a compound. The separated reaction product is routed to a regeneration unit, where the reaction product is treated to produce or regenerate the compound used for deacidizing and the acid gas. The regeneration process according to embodiments of the present invention can be accomplished by regeneration methods known to those skilled in the art in view of the present disclosure. Exemplary regeneration methods include, but are not limited to, thermal decomposition, gas stripping, steam stripping, distillation, treatment through a membrane contractor, pervaporization, pressure differential treatment, microwave, electric and magnetic wave, and a combination thereof.

The regenerated acid gas is collected or disposed of depending on the purpose of the user. The regenerated compound is recycled for use in another cycle of deacidizing the gaseous mixture.

The following examples illustrate the invention but are in no way intended to limit the scope of the present invention.

EXAMPLE 1

Process I

A gas mixture contacts and mixes with a vaporized and/or vaporizing a compound or solution of compound, such as an amine from a pure amine or an amine solution, in a high temperature zone (Section I). The gas stream containing the gas mixture and the vaporized and/or vaporizing amine then flows into a lower temperature zone (Section II) where the reaction products of the amine and one or more acid gases, such as CO2, in the gas mixture are separated out from the gas stream by condensation and/or solidification. The liquid and/or solid form of the reaction products are separated by conventional means in view of the present disclosure. The remaining gas mixture is thus deacidized. The reaction products of amine and $CO_2$, in the form of liquid and/or solid, can be regenerated using methods known in the art in view of the present disclosure.

Alternatively, after the mixing and contacting, the gas stream containing the gas mixture and the vaporized and/or vaporizing amine remains in the same chamber, but the temperature of the chamber is lowered to allow the reaction products to separate out from the gas stream by condensation and/or solidification.

EXAMPLE 2A

Process IIA

A gas mixture contacts and mixes with a compound or solution of compound, such as an amine from a pure amine or an amine solution, in a pressurized chamber. The mixture of the gas and a pure amine or an amine solution is then injected into a second chamber having a lower pressure. The sudden reduction in the pressure vaporizes the amine, and decreases the temperature of the mixture of the gas and amine, and the reaction products of the amine and one or more acid gases, such as CO2, in the gas mixture, are then separated out from the gas stream by condensation and/or solidification. The liquid and/or solid form of the reaction products are separated by conventional means in view of the present disclosure. The remaining gas mixture is thus deacidized. The reaction products of amine and $CO_2$, in the form of liquid and/or solid, can be regenerated using methods known in the art in view of the present disclosure.

The lower pressure chamber can be a simple empty container, such as a container with cooling system. It can also be a cyclone, a cyclone with a cooling system, and/or any other device known to those skilled in the art in view of the present disclosure.

Alternatively, after the mixing and contacting, the mixture of the gas and absorbent remains in the same chamber, but the pressure of the chamber is lowered to allow the reaction products to separate out from the gas stream by condensation and/or solidification.

EXAMPLE 2B

Process IIB

A gas mixture from a pressurized chamber is injected into a second chamber having a lower pressure. At an area near the injection nozzle, which can be in the pressurized chamber or the lower pressure chamber, the gas mixture contacts and mixes with a compound or solution of compound, such as, an amine or amine solution, and vaporizes the amine or amine solution. The sudden reduction in the pressure decreases the temperature of the mixture of the gas and amine, and the reaction products of the amine and one or more acid gases, such as CO2, in the gas mixture, are then separated out from the gas stream by condensation and/or solidification. The liquid and/or solid form of the reaction products are separated by conventional means in view of the present disclosure. The remaining gas mixture is thus deacidized. The reaction products of amine and $CO_2$, in the form of liquid and/or solid, can be regenerated using methods known in the art in view of the present disclosure.

It will be appreciated by those skilled in the art that changes could be made to the embodiments described above without departing from the broad inventive concept thereof. It is understood, therefore, that this invention is not limited to the particular embodiments disclosed, but it is intended to cover modifications within the spirit and scope of the present invention as defined by the appended claims.

The invention claimed is:

1. A method for deacidizing a gas stream comprising one or more acid gases, comprising:

mixing a compound with the gas stream, wherein the compound reacts with the one or more acid gases in the gas stream to form a reaction product in a gas phase;

causing the reaction product to precipitate from the gas phase in a form of a liquid or a solid; and collecting the liquid or the solid reaction product.

2. The method of claim 1, wherein the precipitation of the reaction product is effectuated by cooling or by increasing a pressure of the gas stream.

3. The method of claim 1, wherein at least a portion of the compound precipitates from the gas phase.

4. The method of claim 1, wherein the gaseous stream and the compound are mixed at a first temperature under a first pressure, and the reaction product precipitates from the gas phase at a second temperature under a second pressure, wherein the first temperature is higher than the second temperature.

5. The method of claim 1, wherein the one or more acid gases are selected from the group consisting of carbon dioxide ($CO_2$), sulfur dioxide ($SO_2$), sulfur trioxide ($SO_3$), hydrogen sulfide ($H_2S$), carbon oxysulfide (COS), carbon disulfide ($CS_2$), mercaptans (RSH), nitric oxide (NO), nitric dioxide ($NO_2$), fluorides, HCl, and HF.

6. The method of claim 1, wherein the compound comprises an amine selected from the group consisting of monoethanolamine, diethanolamine, triethanolamine, ethanolamines, isopropanolamines, ethyleneamines, alkyl alkanolamines, methyldiethanolamine, piperidine, piperazine, dibutylamine, diisopropylamine, and a mixture thereof.

7. The method of claim 1, further comprising processing the liquid or the solid reaction product to release the compound from the reaction product.

8. The method of claim 7, further comprising mixing the released compound with the gas stream.

9. The method of claim 1, further comprising vaporizing the compound prior to mixing with the gas stream, upon contacting the gas stream, or after mixing with the gas stream.

10. The method of claim 9, wherein the compound is amine.

11. The method of claim 9, wherein the step of vaporizing the compound is accomplished by heating, microwaving, lowering a pressure thereof, or spraying.

12. The method of claim 9, wherein the compound is in an organic solution or an aqueous solution.

13. The method of claim 12, wherein the aqueous solution or the organic solution comprises one or more basic compounds.

14. The method of claim 13, wherein the basic compound is sodium hydroxide, potassium hydroxide, or an amino acid salt.

* * * * *